UNITED STATES PATENT OFFICE.

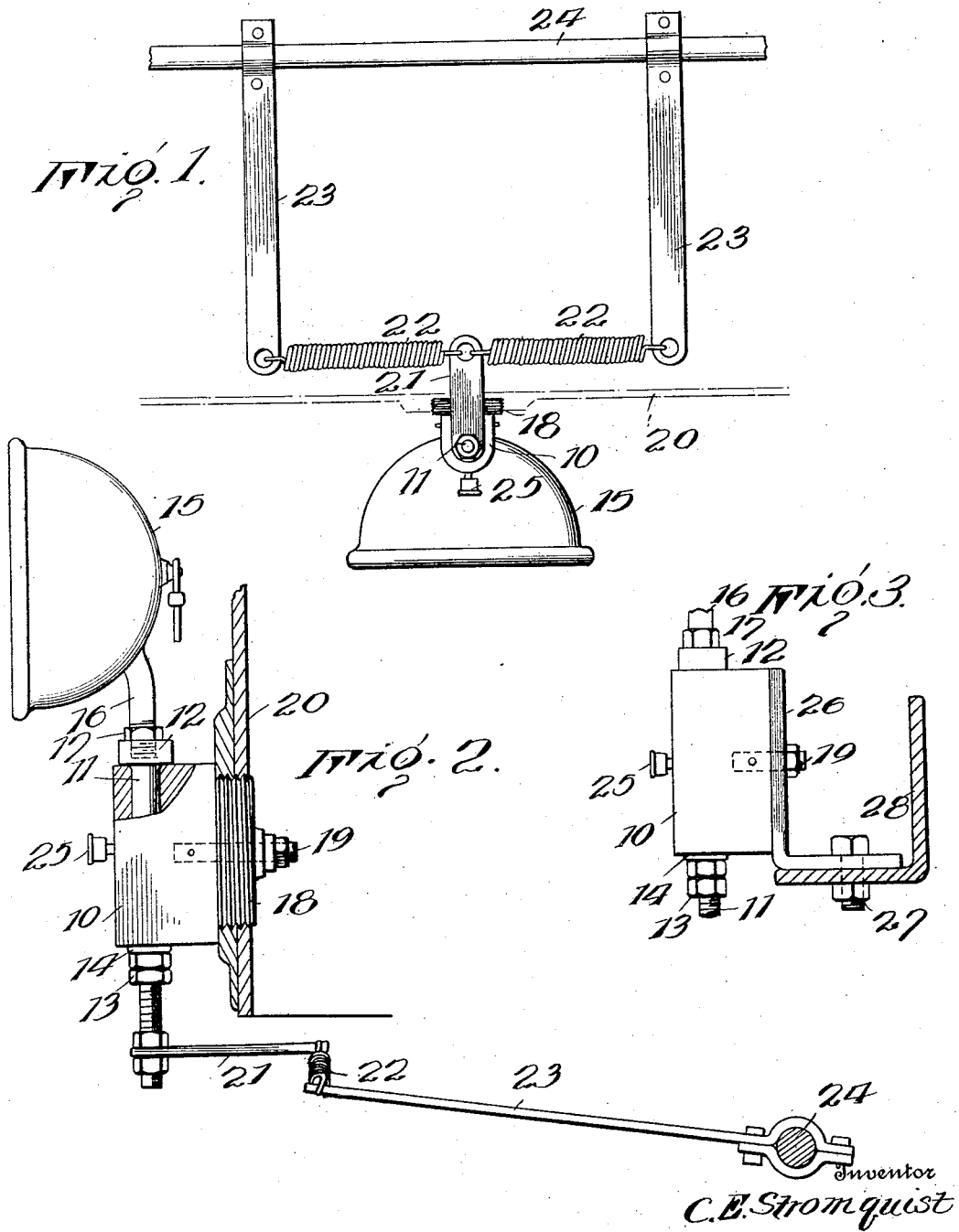

CARL E. STROMQUIST, OF COFFEYVILLE, KANSAS.

HEADLIGHT-STEERING MECHANISM.

1,240,509.  Specification of Letters Patent.  Patented Sept. 18, 1917.

Application filed July 27, 1916. Serial No. 111,695.

*To all whom it may concern:*

Be it known that I, CARL E. STROMQUIST, a citizen of the United States, residing at Coffeyville, in the county of Montgomery and State of Kansas, have invented certain new and useful Improvements in Headlight-Steering Mechanism, of which the following is a specification.

This invention contemplates an improved headlight steering mechanism for motor vehicles and has as its primary object to provide a device of this character which may be readily attached to substantially any vehicle of conventional type and wherein the headlights will be directed in the path of the vehicle as the vehicle is steered.

The invention has as a further object to provide a device of this character which may be mounted in the crank receiving opening in the frame of the vehicle and attached to the connecting rod of the vehicle steering gear so that the shifting of the said rod will direct the headlight as the vehicle is steered.

And a still further object of the invention is to provide an arrangement employing opposed springs for yieldably holding the headlight against rotary vibration, so that the headlight will throw an even and steady stream of light.

Other and incidental objects will appear as the description proceeds and in the drawings wherein I have illustrated the preferred embodiment of the invention and wherein similar reference characters designate corresponding parts throughout the several views:

Figure 1 is a bottom plan view showing the device in connection with the connecting rod of a vehicle steering gear, Fig. 2 is a side elevation partly in section and more particularly illustrating the mounting of the device upon the vehicle as well as the mounting of the headlight and the manner in which the said headlight is connected to the connecting rod of the vehicle steering mechanism, and Fig. 3 is a fragmentary side elevation showing a slightly modified type of mounting for the headlight.

In carrying out the invention, a body block or member 10 is employed upon which is swiveled a vertical shaft 11. This shaft, at its upper extremity, is provided with a head 12 seating upon the upper face of the block and at its lower extremity, is screw threaded to receive lock nuts 13. Preferably, a washer 14 is interposed between the nuts 13 and the bottom of the block 10. Mounted upon the shaft 11 is a headlight 15 which may be of any conventional type and is provided with a stem 16 preferably screw threaded into the head 12 of the shaft 11 to be detachably connected to said shaft with a lock nut 17 holding the stem in position.

Mounted upon the rear side of the block 10, is a screw threaded plug or supporting element 18, which is axially formed with a suitable opening to receive a bolt 19 extending freely through the said opening and screw threaded into the block 10 for detachably connecting the plug with the said block. The plug 18 is of a diameter to engage within the crank receiving opening provided in the forward end member 20 of a motor vehicle chassis below the radiator of the said vehicle, as conventionally illustrated in Figs. 1 and 2 of the drawings, such opening being ordinarily of no use when the vehicle is provided with a self-starting mechanism. The headlight 15 may thus readily be detachably connected to the vehicle and will be arranged at a point substantially midway between the fixed headlights of the vehicle to effectually light up the road surface.

Screw threaded upon the lower extremity of the shaft 11 is a rearwardly extending crank arm 21 fixed upon the said shaft by suitable lock nuts. Extending laterally in opposite directions from the inner extremity of the crank arm 21 are springs 22. These springs may be of any approved type and at their outer extremities, are connected to links or arms 23 having their inner terminals secured to the connecting rod 24 of the vehicle steering mechanism as conventionally shown in the drawings with the said arms extending forwardly from the said rod in substantially parallel spaced relation. As will now be well understood, when the vehicle is steered and the rod 24 is consequently shifted longitudinally, the arms 23 will be correspondingly moved laterally to turn the crank arm 21 and rotate the headlight 15 to direct the headlight in the path of the vehicle. Consequently, the said headlight will always be turned as the vehicle is steered and in this connection, it will be observed that the opposed springs 22 will, under normal conditions act upon the crank arm 21 to yieldably hold the headlight 15 against rotary vibration so that the said light will throw an even and steady light. Preferably, the body block 10 of the device will be equipped with a lubricating cup 25 for oiling the shaft 11.

While I have indicated that my improved headlight is preferably mounted in the crank receiving opening in the member 20 of the vehicle, still, I do not wish to be limited to this arrangement and in Fig. 3 of the drawings, have shown a slightly modified type of mounting for the body block 10. In this modification, the plug 18 is removed, and an angle bracket or supporting element 26 is connected by one of its arms with the bolt 19. The other arm of the said bracket may be attached in any approved manner as by a bolt 27, to any convenient point of the vehicle body, or if desired, the vehicle body may be provided with a hanger 28 for receiving the said bracket. The body block 10 will thus be securely connected to the vehicle for supporting the headlight and since this modified structure is otherwise constructed in accordance with the preferred form of the invention, a further description thereof will not be given.

Having thus described my invention, what I claim and desire to secure by Letters Patent is:

1. The combination with a motor vehicle provided with a body having a motor crank receiving opening formed therein, of a headlight for the vehicle including a body member, a supporting element carried thereby and engaged in said opening for connecting the body member with the vehicle, a headlight receiving shaft rotatably mounted upon the body member, a crank extending rearwardly from said shaft, opposed yieldable means extending in opposite directions from the free extremity of said crank, and arms adapted for attachment to the connecting rod of the vehicle steering gear with the said arms projecting forwardly at opposite sides of the crank and engaged with said yieldable means whereby shifting of the rod to steer the vehicle will rotate the said shaft.

2. A device of the character described including a body member, a screw threaded plug mounted thereon and adapted for engagement with a vehicle for connecting the body member thereto, a bolt connecting the said plug with the body member, a headlight carrying shaft rotatably mounted upon the body member, and means for rotating the said shaft and adapted for attachment to the connecting rod of a vehicle steering gear whereby shifting of the said rod to steer the vehicle will rotate the said shaft.

In testimony whereof I affix my signature.

CARL E. STROMQUIST. [L. S.]

Copies of this patent may be obtained for five cents each, by addressing the "Commissioner of Patents, Washington, D. C."